PHOTOSENSITIVE MULTIVIBRATOR CIRCUITS

Filed Sept. 4, 1956

Raymond M. Wilmotte
and Robert L. Carmine INVENTORS

BY Paris and Haskell 3,214,592
PHOTOSENSITIVE MULTIVIBRATOR CIRCUITS
Raymond M. Wilmotte, Box 397, Kendall Branch Post Office, Miami, Fla., and Robert L. Carnine, Miami, Fla.; said Carnine assignor to said Wilmotte
Filed Sept. 4, 1956, Ser. No. 607,770
6 Claims. (Cl. 250—209)

The present invention relates to flip-flop circuits, delay multivibrators, and oscillators of the multivibrator type. More particularly, the present invention is concerned with these types of circuits wherein the basic components, instead of being vacuum tubes are couples of photoresponsive elements and variable light sources.

In their preferred, and what is presently considered their most practical embodiments for the present purposes, these couples comprise photoconductors, such as cadmium sulfide crystals, as the photoresponsive elements, and light transmitting electroluminescent condensers or cells as the variable light source. Photoconductors in the form of suitably activated cadmium sulfide crystals are well known, and such elements can be readily formed possessing relatively wide ranges of photo response and time characteristics to illumination. Light transmitting electroluminescent condensers are also well known, and generally possess the property of emitting light in proportion to the magnitude of A.C. voltage impressed thereacross. These electroluminescent condensers also have the property of a threshold voltage, below which the condensers remain substantially dark or non-luminant.

In accordance with the present invention, by appropriately electrically interconnecting electric signal responsive variable light sources and photoresponsive elements, such as the types above referred to, and also by appropriately coupling the luminance of the light sources to the photoresponsive elements, circuits can be formed broadly functionally equivalent to vacuum tube flip-flop circuits, delay multivibrators, and multivibrator type oscillators.

It is accordingly one object of the present invention to provide novel multivibrator and flip-flop circuits.

Another object of the present invention is to provide such circuits utilizing electric signal responsive variable light sources coupled with photoresponsive elements as the basic components of the circuits.

Another object of the present invention is to provide such circuits utilizing electroluminescent condensers or cells and photoconductors as the basic components of the circuits.

Still another object of the present invention is to provide circuits which are broadly functionally equivalent to conventional flip-flop circuits and multivibrators, wherein photoconductors and light transmitting electroluminescent condensers are utilized in place of vacuum tubes.

Other objects and the advantages of the present invention will become apparent to those skilled in the art from a consideration of the following detailed description of three exemplary specific embodiments thereof had in conjunction with the accompanying drawings in which.

Figure 1:
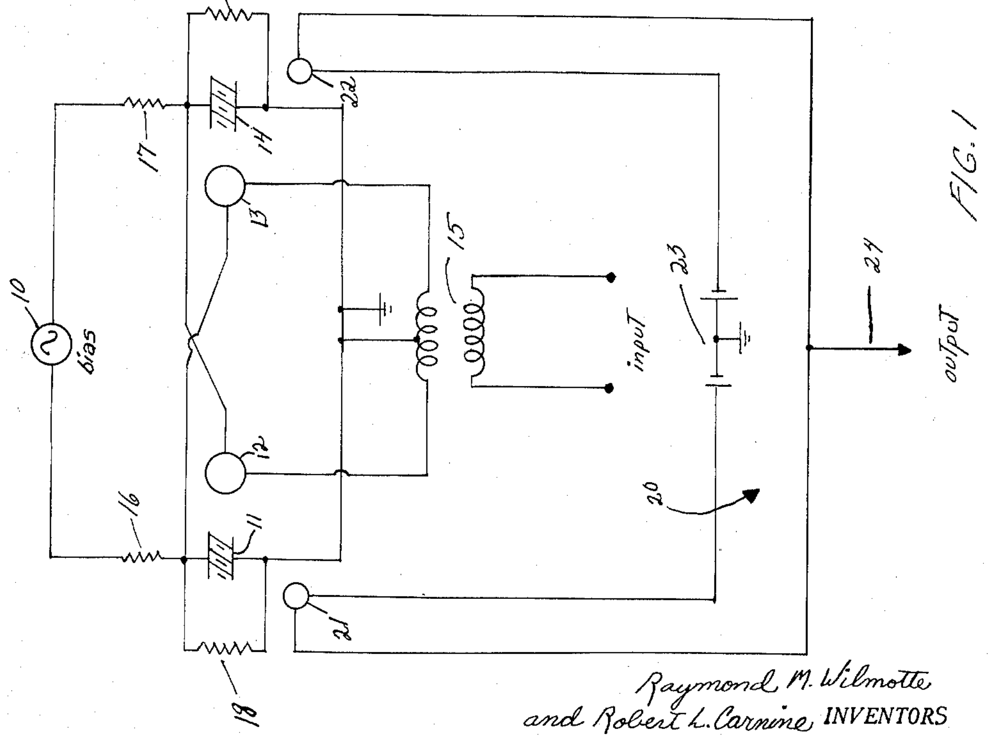
FIG. 1 is a schematic diagram of a trigger responsive flip-flop circuit.

Referring to the flip-flop circuit of FIG. 1, it comprises two electroluminescent condensers 11 and 14 connected in push-pull relation to an A.C. voltage bias source 10. A photoconductor 12, such as a cadmium sulfide crystal, is physically placed adjacent the condenser or cell 11 to be illuminated thereby, but is light shielded from the cell 14. Electrically, photoconductor 12 is connected in parallel with and across cell 14. A second similar photoconductor 13 is physically placed adjacent cell 14 to be illuminated thereby, and is light shielded from cell 11. This photoconductor 13 is connected in electrical parallel relation with and across cell 11. Additionally, resistors 16 and 17 may be inserted between the cells 11 and 14 respectively and the bias source 10, and resistors 18 and 19 may be connected in shunt across the respective cells 11 and 14 if desired. Although the two branches of this circuit appear in the schematic to be symmetrical, some asymmetry is provided either inherent in the response of a cell or photoconductor, or specifically established in the values of the resistors.

When an appropriate value of A.C. voltage is applied to this circuit from the bias source 10 (which value is chosen to impress across the condensers a voltage in excess of their threshold voltage when the photoconductors 12 and 13 are not illuminated) because of the asymmetry of the circuit, one cell is at the outset preferentially illuminated, or illuminated to a greater extent than the other. It is assumed for the purpose of example that cell 14 obtains this initial preference. The luminance of cell 14 immediately increases the conductivity of photoconductor 13 reducing the voltage across cell 11. Thus, any tendency of cell 11 to luminesce upon initial application of the bias voltage is quickly suppressed, and the cell 11 attains a stable state of darkness, while cell 14 attains stable state of luminance.

In addition to the foregoing circuit, the cells 11 and 14 are connected in push-pull relation to a signal input, such as transformer 15, through the respective photoconductors 12 and 13, so that an A.C. input voltage is applied equally to both photoconductors. With the circuit in the stable state above described, if an input pulse is applied to transformer 15, a much greater voltage therefrom is passed by the illuminated photoconductor 13 for application across cell 11, than is passed by the non-illuminated photoconductor 12 for application across cell 14. If this input pulse is of a sufficiently high value to cause cell 11 to luminesce more brilliantly than the existing luminance of cell 14, photoconductor 12, being illuminated by cell 11 becomes more conductive than cell 13. The time duration of the input pulse is chosen to terminate with the circuit in this condition. At this moment both cells 11 and 14 are shunted by relatively conductive photoconductors and the bias voltage does not luminesce either cell. As the conductivity of the photoconductors decays, the bias voltage across the cells increases. Since this decay process started with photoconductor 12 at a higher conductivity than photoconductor 13, the luminescent threshold voltage is reached across cell 11 before it is reached across cell 14. Cell 11 then starts to luminesce, increasing the conductivity of photocell 12, so that cell 14 remains dark. The resultant luminance of cell 11 and darkness of cell 14 is a stable state. With the circuit in this stable state, it is apparent from the foregoing that the application of another input pulse to transformer 15 results in luminance of cell 14 and darkness of cell 11 as a stable state. Thus, this circuit functions as a flip-flop circuit, alternating between two stable states, with a half cycle of alternation in response to each input pulse.

The alternations of this flip-flop circuit can be read out by direct observation of the electroluminescent condensers, if desired, or the alternations can be detected electrically, as illustrated for example by circuit 20. Circuit 20 comprises two photoconductors 21 and 22 connected in series to a voltage source 23. Photoconductor 21 is placed to be illuminated by cell 11, while photoconductor 22 is placed to be illuminated by cell 14. Thus, the output at 24 varies in accordance with the alternations of luminescence between cells 11 and 14. This output may be used in the same manner as any flip-flop circuit output, for example as in scale of two counting or switching.

Figures 2, 3:
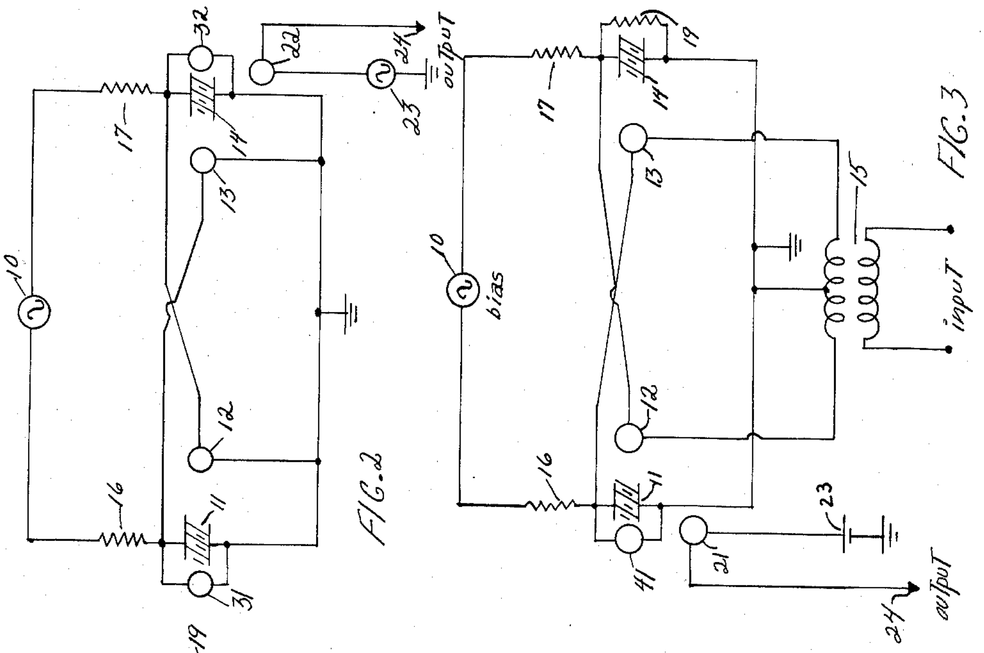
FIG. 2 is a schematic diagram of a multivibrator type oscillator.
FIG. 3 is a schematic diagram of a one-shot delay multivibrator.

The embodiment of the invention illustrated in FIG. 2 is an oscillator. It includes the same basic circuit of FIG. 1: two electroluminescent cells 11 and 14 connected in push-pull relation to a voltage source 10; a photoconductor 13 luminance-coupled to cell 14 and electrically parallel with and connected across cell 11; a photoconductor 12 luminance-coupled to cell 11 and electrically parallel with and connected across cell 14; and resistors 16 and 17 may be interposed between cells 11 and 14 respectively and the voltage source 10. In addition, in the present circuit, a photoconductor 32 is luminance-coupled to cell 14 and electrically shunts this cell; while a photoconductor 31 is luminance-coupled to cell 11 and electrically shunts this cell. For reasons which will become apparent hereinafter, photoconductors 31 and 32 are chosen to have a slower light response time constant than photoconductors 12 and 13. In other words, when cell 14 is caused to luminesce the conductivity of photoconductor 13 increases at a more rapid rate than the conductivity of photoconductor 32; and a similar relationship is established for the response of photoconductors 12 and 31 to luminance of cell 11.

With an inherent or designed asymmetry between the two branches of this circuit, it is assumed, for the purpose of example, that when the voltage source 10 is applied to the cells, cell 14 luminesces first, increasing the conductivity of the fast response photoconductor 13, thus decreasing the voltage across cell 11 and rendering it non-luminescent. While cell 14 luminesces relatively brilliantly, slow response photoconductor 32 slowly increases in conductivity, thus tending to decrease the voltage across and hence the luminance of cell 14. This action increases the resistance of photoconductor 13 and hence the voltage across cell 11. The parameters of the circuit are chosen such that during this luminance decay of cell 14, the luminance voltage threshold is reached across cell 11, and it starts to luminesce. The luminescence of cell 11 acts upon fast response photoconductor 12 to increase its conductivity. The combined shunting of cell 14 by relatively conductive photoconductors 12 and 32 decreases the voltage across cell 14, causing further luminance decay, which causes further increase in resistance of photoconductor 13, and hence greater voltage across the luminance of cell 11. This process continues until cell 14 is extinguished and cell 11 luminesces relatively brilliantly. While cell 11 luminesces, the conductivity of slow response photoconductor 31 gradually increases, causing a decay in cell 11 luminance, an increase in resistance of photoconductor 12, and thus an increase in voltage applied across cell 14. During the luminance decay of cell 11, the luminescence voltage threshold of cell 14 is reached, and it begins to luminesce, resulting in further decay and extinguishment of cell 11 as cell 14 reaches maximum brilliance, in accordance with the process, described above. The alternation of luminance between cells 11 and 14 continues in this manner so long as the voltage from source 10 is applied.

Thus, the circuit of FIG. 2 is a multivibrator type of oscillator. The frequency of this oscillator is primarily controlled by the speed of luminance response of the photoconductors, and it is apparent that the frequency can be controlled by appropriate choice of photoconductors having the desired luminance time response. Since for most purposes it would be desired that the response of photoconductors 12 and 13 be as fast as possible, the frequency would be determined by choosing appropriate time response photoconductors for slow response elements 31 and 32.

As in the embodiment of FIG. 1, an electrical output may be readily obtained by providing a photoconductor 22 luminance-coupled to one cell, such as 14, having a voltage source 23 applied thereto, to provide at 24 a voltage output fluctuating in accordance with the luminance of cell 14.

The principles of the foregoing embodiments of FIGS. 1 and 2 may be utilized together to provide a one shot delay multivibrator as shown in FIG. 3. The circuit of FIG. 3 is substantially similar to the flip-flop circuit of FIG. 1, and the corresponding parts have been given the same numerals. The only difference in these two circuits, other than the output circuit, is in the substitution of slow luminance response photoconductor 41 (such as the photoconductor 31 in FIG. 2) for the shunt resistor 18. In this circuit, the asymmetry is specifically chosen such that upon the application of the bias voltage from source 10, a stable state is reached with cell 14 in full luminance and cell 11 extinguished.

When an input pulse similar to that used for FIG. 1 is applied to transformer 15, in accordance with the discussion had in relation to FIG. 1, the state of the circuit switches to luminance of cell 11 and extinguishment of cell 14. However, because of the slow response photoconductor 41, this latter state is not stable. As cell 11 luminesces, photoconductor 41 slowly increases in conductivity causing a luminance decay in cell 11, increasing the resistance of photoconductor 12, until during the luminance decay of cell 11 the threshold voltage of cell 14 is reached, and it commences to luminesce, resulting in extinguishment of cell 11 and full luminance of cell 14. The circuit thus reverts to its initial stable state, and remains in this condition in readiness for the next input pulse. The duration of luminescence of cell 11 is primarily a function of the parameters of the circuit, and most particularly of the time response of photoconductor 41 to cell 11 luminance.

An electrical output may be derived from this circuit by luminance-coupling a photoconductor 21 to cell 11, and applying a voltage source 23 across this photoconductor. A voltage will then be obtained at output 24 in accordance with the luminance of cell 11, this output being essentially the same as that of a conventional one shot delay multivibrator. This output may be used for the same purposes as that of a conventional multivibrator, such as obtaining signal time delays.

There have thus been described three specific embodiments of the present invention illustrating it in the forms of a flip-flop circuit, an oscillator, and a delay multivibrator. It is understood that these foregoing specific embodiments are presented merely by way of example to facilitate a complete understanding of the present invention, and variations and modifications of these circuits will be apparent to those skilled in the art. Accordingly, it is intended that such modifications and variations as are embraced by the spirit and scope of the appended claims are within the purview of the present invention.

We claim:

1. A multivibrator circuit comprising two light sources variable in response to an electrical signal applied thereto, a first photoresponsive impedance element connected in electrical aparallel relation to a first of said light sources and luminance coupled to the second of said light sources, a second photoresponsive impedance element connected in electrical parallel relation to the second light source and luminance coupled to the first light source, means for applying an electrical energizing signal across both said light sources, said circuit having an asymmetry whereby one light source becomes luminant and the other is non-luminant in response to the application of said signal, and means for causing said luminant light source to become non-luminant and said non-luminant light source to become luminant comprising signal input means connected to apply an input signal simultaneously to each of said light sources through its respective electrically connected impedance, each said light source being in electrical series relationship with its said respective electrically connected impedance relative to said signal input means.

2. A multivibrator circuit as defined in claim 1, and further including an additional photoresponsive impedance connected across and luminance-coupled to one of said light sources.

3. A multivibrator circuit comprising two solid state electroluminescent cells connected for the application of a voltage thereto, a first solid state photoconductor connected in electrical parallel relation to a first of said celles and luminance-coupled to the second of said cells, a second solid state photoconductor connected in electrical parallel relation to the second cell and luminance-coupled to the first cell, means for applying an electrical energizing signal across both said cells, said circuit having an asymmetry whereby one cell luminesces and the other is non-luminant in response to the application of said voltage, and means for causing the luminant cell to become non-luminant and said non-luminant cell to become luminant and for effecting such alternations in luminance of said cells repetitively comprising a signal input means connected to apply input signals simultaneously to each of said light cells through its respective electrically connected photoconductor, each said light cell being in electrical series relationship with its said respective photoconductor relative to said signal input means.

4. A multivibrator circuit comprising two solid state electroluminescent cells connected for the application of a voltage thereto, a first solid state photoconductor connected in electrical parallel relation to a first of said cells and luminance-coupled to the second of said cells, a second solid state photoconductor connected in electrical parallel relation to the second cell and luminance-coupled to the first cell, means for applying an electrical energizing signal across both said cells, said circuit having an asymmetry whereby one cell luminesces and the other is non-luminant in response to the application of said signal, and means for causing the luminant cell to become non-luminant and said non-luminant cell to become luminant and for effecting such alternations in luminace of said cells repetitively, wherein the last-mentioned means is a pair of photoconductors, one connected across and luminance-coupled to one of said cells, and the other so connected to the other of said cells.

5. A multivibrator circuit as defined in claim 3, and further including an additional photoconductor connected across and luminance-coupled to one of said cells.

6. A multivibrator circuit comprising two light sources variable in response to an electrical signal applied thereto, a first photoresponsive impedance element connected in electrical parallel relation to a first of said light sources and luminance coupled to the second of said light sources, a second photoresponsive impedance element connected in electrical parallel relation to the second light source and luminance coupled to the first light source, means for applying an electrical energizing signal across both said light sources, said circuit having an asymmetry whereby one light source becomes luminant and the other is non-luminant in response to the application of said signal, a third photoresponsive impedance connected across and luminance coupled to one of said light sources, and a fourth photoresponsive impedance connected across and luminance coupled to the other of said light sources, the two last-mentioned impedances causing said luminant light source to become non-luminant and said non-luminant light source to become luminant and causing such alternations in luminance of said light sources repetitively.

References Cited by the Examiner

UNITED STATES PATENTS

| | | | |
|---|---|---|---|
| 2,658,141 | 11/53 | Kurland | 315—157 X |
| 2,694,785 | 11/54 | Williams. | |
| 2,727,683 | 12/55 | Allen et al. | 250—209 X |
| 3,107,301 | 10/63 | Willard | 250—227 X |

FREDERICK M. STRADER, *Primary Examiner.*

RALPH G. NILSON, MAX L. LEVY, *Examiners.*